United States Patent [19]

Seamone

[11] 4,050,533

[45] Sept. 27, 1977

[54] POWERED WHEEL CHAIR

[75] Inventor: Woodrow Seamone, Rockville, Md.

[73] Assignee: Government of the United States of America rep. Administration of Veterens Affairs, Washington, D.C.

[21] Appl. No.: 698,688

[22] Filed: June 22, 1976

[51] Int. Cl.$^2$ .............................................. B62D 11/04

[52] U.S. Cl. ............................... 180/6.5; 180/DIG. 3

[58] Field of Search ...................... 180/6.5, 6.48, 6.28, 180/DIG. 3; 280/242 WC; 297/DIG. 4

[56] References Cited

U.S. PATENT DOCUMENTS

| | | | |
|---|---|---|---|
| 3,100,547 | 8/1963 | Rosenthal | 180/6.5 |
| 3,100,860 | 8/1963 | Rosenthal | 180/6.5 |

*Primary Examiner*—Joseph F. Peters, Jr.
*Assistant Examiner*—R. Schrecengost
*Attorney, Agent, or Firm*—Holman & Stern

[57] ABSTRACT

Disclosed is a powered wheel chair with individual motors driving each of two separate drive wheels. The motors are controlled by the amount of torque applied to the handrim of the driving wheel. If the operator pushes on the handrim of the drive wheel, as is well known, the torque created by such movement is sensed and activates the drive motor to cause the drive wheel to rotate. The power applied to the drive motor is controlled by the amount of torque applied to the handrim such that the conventional control of the wheel chair is maintained.

8 Claims, 3 Drawing Figures

POWERED WHEEL CHAIR

BACKGROUND OF THE INVENTION

The present invention relates to powered wheel chairs for patients with control over their arms and hands but without the strength to provide motive power.

Powered wheel chairs are well known in the art and are generally identified with a joy stick control. By pushing the joy stick forward both powered wheels run at the same speed and the wheel chair goes in a straight line. By moving the joy stick towards the left, a left turn is initiated, etc. For patients who have only the use of one arm or one appendage the joy stick control must be considered the present state of the art. However there is a second class of patients in which the individual has the use of his arms and hands but, because of his affliction, lacks the strength to provide his own motive power as in an unpowered wheel chair. In the past, such individuals have been forced to utilize the joy stick control wheel chairs which suffer from both controllability and maneuverability problems in close fitting quarters. The reason for these problems is that the man-machine interface in the joy stick control lacks the sensitivity and contains inherent system lags which make precise positional control very difficult.

SUMMARY OF THE INVENTION

It is therefore an object of the present invention to provide a power wheel chair in which control of the drive motors is provided by torque applied by the operator to the handrim.

A further object is to provide a powered wheel chair which has the simplicity of operation comparable to an unpowered wheel chair.

A still further object of the present invention is to provide a powered wheel chair with precise controllability and maneuverability characteristics and is capable of being operated by patients with limited appendage strength.

In accordance with the above and other objects, the handrims are attached to the drive wheels on each side of the wheel chair, through a torque transducer which provides a signal in proportion to the driving torque applied to the handrim. This signal is utilized in a control circuit to vary the power applied to the wheel chair drive motor which is connected to the drive wheel. Appropriate elastic contraints such as a torsional spring and appropriate damping are built into the flexible connection to prevent undesirable oscillations. Thus by sitting in the chair and applying a very small forward pressure on the handrim, the signal generated by the transducer would cause the drive motor for that wheel to begin operation with the torque generated by the drive motor in direct proportion to the torque applied to the handrim. Thus, with very little effort, a patient with the use of his arms and hands could move forward and precisely control the position of the wheel chair.

BRIEF DESCRIPTION OF THE DRAWINGS

A more complete appreciation of the invention and the attendant advantages thereof will be more clearly understood by reference to the following detailed drawings wherein.

DETAILED DESCRIPTION OF A PREFERRED EMBODIMENT

Figure 1:
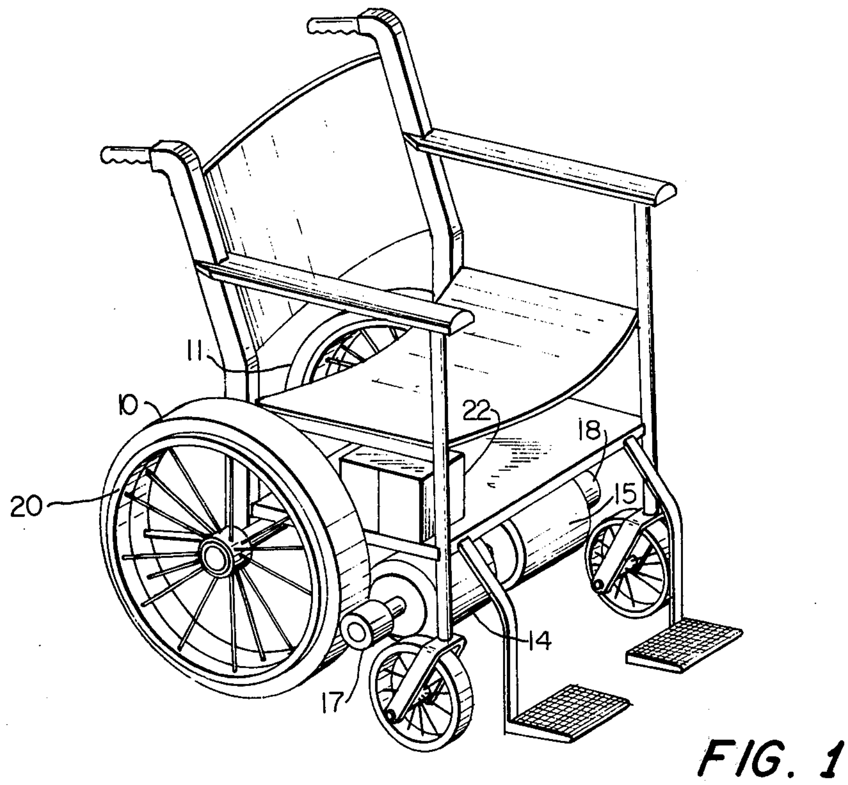
FIG. 1 is a perspective view of a powered wheel chair according to one embodiment of the present invention.

Reference is now made to the drawings wherein like reference numerals designate identical parts throughout the several views. In FIG. 1, a powered wheel chair is shown with drive wheels, 10 and 11 powered by electric motors 14 and 15, respectively. The motors cause the drive wheels to rotate through friction drive 17 and 18. A handrim 20 is flexibly mounted around the periphery of the drive wheel such that it undergoes a small annular displacement relative to the drive wheel when the operator pushes on the handrim. The battery, control circuits, and associated wiring are contained in box 22 and are thus disposed away from the operator.

Figure 2:
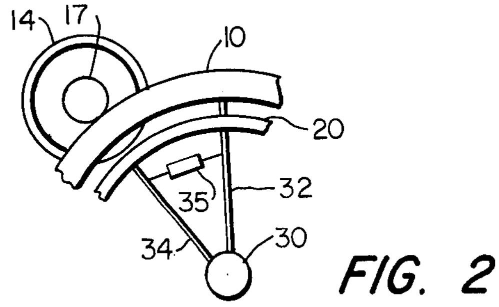
FIG. 2 is a schematic representation illustrating the control transducer.

FIG. 2 schematically represents the control mechanism for the powered wheel chair. The drive wheel and the handrim 20 are connected to a central hub 30 through spokes 32 and 34, respectively. Because of the structural nature of the spokes, when the torque is applied to the handrim, the spokes will be deflected towards or away from each other depending on the direction of the applied torque. Angular position transducer 35 provides a signal indicative of the angular displacement and controls the torque applied to the drive wheel 10 through friction drive 17 by motor 14. Although transducer 35 has been shown schematically as being connected between two spokes, it could be included in the hub 30 or in any other manner known to those skilled in the art. Similarly numerous methods for elastically mounting the handrim on the drive wheel other than utilizing different sets of spokes are well known to those of ordinary skill.

Figure 3:
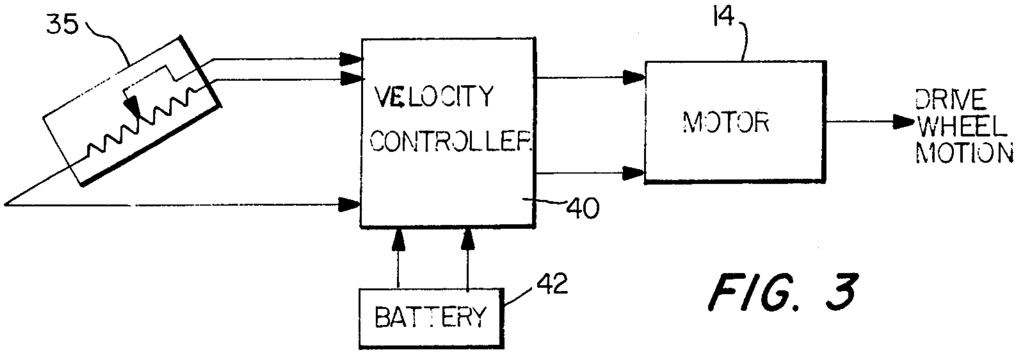
FIG. 3 is a block diagram of the control circuitry in the present invention.

FIG. 3 is a blocked diagram showing the velocity controller 40 which provides an electrical output to motor 14 causing drive motion through friction drives 17. The velocity controller 40 is powered by battery 42 and controlled by an angular position transducer 35. Although any number of devices may be utilized to provide an angular position signal, a simple three-lead potentiometer may be utilized in one embodiment. The circuitry of velocity controller 40 is well known to those skilled in the art and upon sensing the change in resistance in transducer 35 an output will be provided to motor 14 causing drive wheel 10 to rotate in the appropriate direction.

The type of control achieved in this invention is more like a power assisted steering system rather than total power steering system in that a degree of feedback (due to the necessity of flexing the spokes to obtain an initial signal) is provided. The sensitivity of the system or degree of power assist can be readily varied to suit the individual patient needs by a simple gain adjustment in the velocity controller 40. Therefore the effort input required by the patient would be independent of the actual torque required to operate the wheel chair over rugs, small inclines, etc. Because of the elastic constraint of the spokes (or any other structural mounting system with a handrim), the system is self-centering such that power is applied to the motor only when the operator pushes on the handrim. This provides controllability identical to the conventional manual unpowered wheel chairs. Thus with the Applicant's invention a wheel chair is provided which has good controllability in tight quarters and yet minimizes the actual physical exertion required to operate the wheel chair. The implementation of this wheel chair system requires little or no additional training for patients and is readily compatible with patients presently utilizing powered or unpowered wheel chairs.

Although the invention has been described relative to a specific embodiment, it is not so limited and many improvements and modifications thereto will be obvious to those of ordinary skill. Therefore the scope of the present invention is limited only by the appended claims.

I claim:

1. In a powered wheel chair for providing transportation to human passengers including drive wheels rotatably mounted on said wheel chair, said drive wheels being independently powered by electric motors, said improvement comprising:

handrim means flexibly mounted on said wheel chair drive wheels for providing relative angular displacement to the drive wheels upon the application of torque thereto;

transducer means, responsive to said relative angular displacement, for providing an electrical output which is a function of torque applied to said handrim means; and controller means, responsive to said transducer means electrical output, for providing electric power to said electric motors.

2. The apparatus in claim 1 wherein said handrim means is mounted on each of said drive wheels.

3. The apparatus in claim 2 wherein said transducer means electrical output is directly proportional to torque applied to said handrim means.

4. The apparatus in claim 2 wherein said controller means includes battery means for providing a source of electric power.

5. The apparatus in claim 2 wherein said drive wheel and said handrim means are mounted to said wheel chair through a common hub, said hub including said transducer means.

6. The apparatus in claim 2 wherein said transducer means comprises a potentiometer.

7. The apparatus in claim 2 wherein said transducer means comprises a magnetic transducer.

8. The apparatus in claim 2 wherein said controller means is manually adjustable for providing a variable electric power to said electric motors in response to a given transducer means electrical output.

* * * * *